Patented Sept. 5, 1933

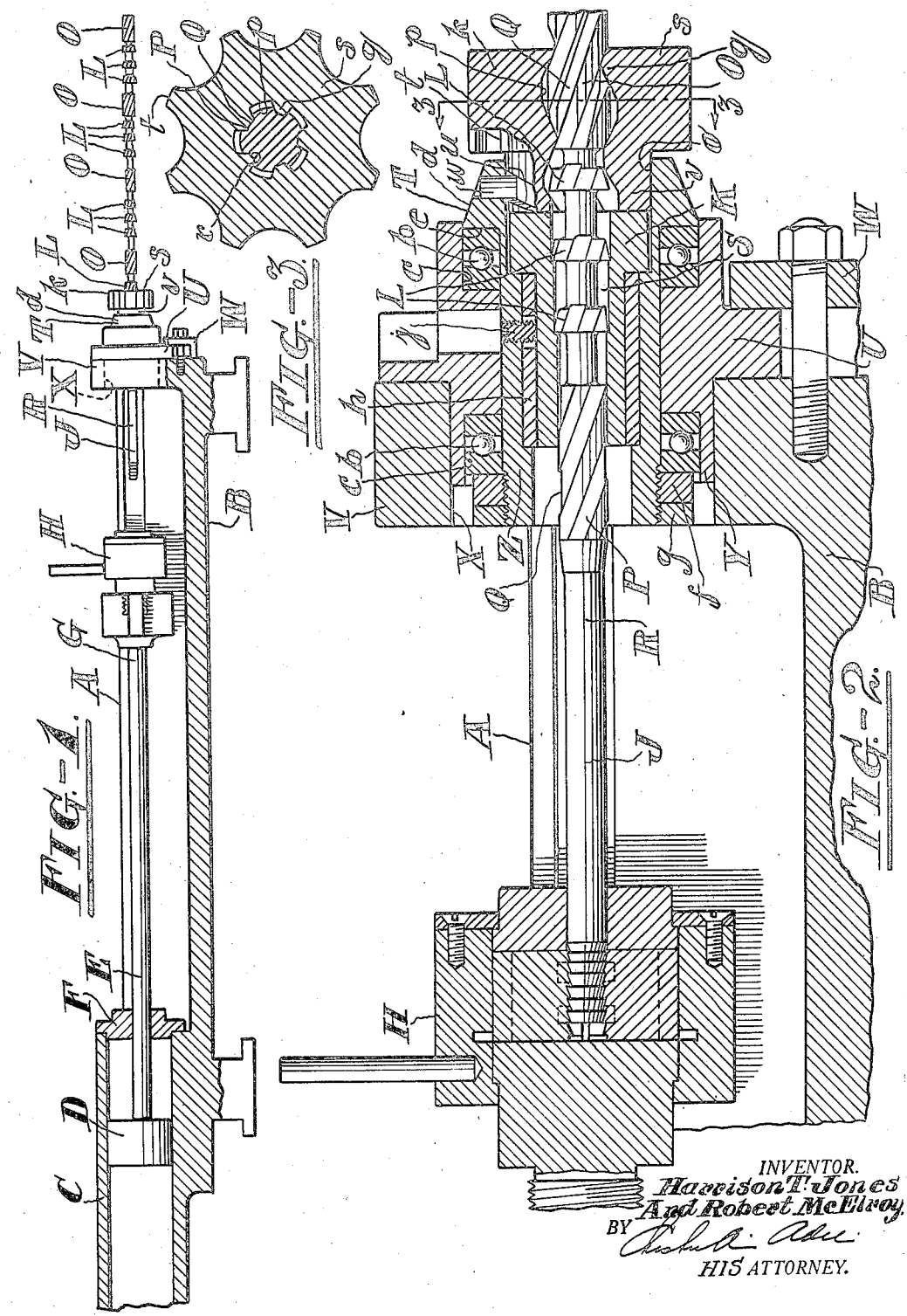

1,925,837

UNITED STATES PATENT OFFICE 1,925,837

BROACHING APPARATUS

Harrison T. Jones and Robert McElroy, Easton, Pa., assignors to Ingersoll-Rand Company, Jersey City, N. J., a corporation of New Jersey Application December 29, 1930
Serial No. 505,356

3 Claims. (Cl. 90—33)

This invention relates to broaching apparatus, but more particularly to apparatus of this character for broaching spiral flutes in the interior of hollow articles.

One object of the invention is to assure the accurate fluting of such articles and another object is to enable formation of internal flutes of short lead of spiral.

Other objects will be in part obvious and in part pointed out hereinafter.

In the drawing accompanying this specification and in which similar reference characters refer to similar parts, Figure 1 is a longitudinal elevation, partly broken away, of a power device equipped with broaching apparatus constructed in accordance with the practice of the invention, Figure 2 is an enlarged sectional elevation of the broaching apparatus and a portion of the power device, and Figure 3 is a transverse view taken through Figure 2 on the line 3—3 looking in the direction indicated by the arrows.

Referring more particularly to the drawing and at first to Figure 1, A represents a power device shown for illustrative purposes as a hydraulic press of the horizontal type having a main frame B and a cylinder C into the ends of which pressure fluid may be admitted in any well known manner for actuating a piston D reciprocable within the cylinder.

The piston D which may be held against rotary movement in any suitable manner has a piston rod E extending slidably through a head F of the cylinder C and carries on its outer or free end G chuck mechanism H which may be of any suitable type adapted for gripping a working implement, such as a broach J, and for holding said broach against rotation.

The broach J is illustrated as being of the type intended for forming spiral flutes in the interior of an article, such as that designated by K, and is provided along the length thereof with alternate series of teeth L and pilots O in which the cutting teeth L and the pilots O are provided with flutes P of the same lead and which flutes correspond to the lead of the flutes intended to be formed in the article K. The distance of the bottom surfaces Q of the flutes P from the longitudinal axis of the broach J is the same throughout the entire length of the broach irrespective of the number of pilots and series of cutting teeth. The outer diameters of the cutting teeth and the pilots decrease however, in the direction of the leading pilot, as for instance, that pilot P adjacent the body or shank portion R of the broaching tool J. The teeth P are so spaced with respect to the pilots P and the pitch of the teeth is such that ample chip spaces S will exist around the body portion of the broach.

In accordance with the present invention a holder designated generally by T is provided for supporting the article K with respect to the broach J. The holder T is journalled in a support plate U which is in this instance clamped to a bracket V of the power device A, as by means of a clamp plate W bolted to the bracket V.

The bracket V has a bore X arranged coaxially with the rod E and the support plate U is provided with a boss Y which extends into the bore X to centralize said bearing plate with respect to the rod E and therefore also to the broach J.

The holder T is shown as being in the form of a sleeve Z which is journalled in the bearing plate U and is provided with a pair of thrust bearings $b$ seated in recesses $c$ in the opposite ends of the bearing plate U.

On the front end of the holder T is a head $d$ having a shoulder $e$ to seat against the adjacent thrust bearing $b$. The opposite end of the holder T is threaded externally to accommodate a nut $f$ which acts against the other thrust bearing $b$ and serves to clamp the holder T and the thrust bearings $b$ securely in position. A jamb nut $g$ is threaded on the holder T to prevent unthreading of the nut $f$.

Within the holder T is a bushing $h$ to slidably receive the article K, and in the wall of the holder T and extending through the bushing $h$ is a set screw $j$ whereby the article K may be clamped fixedly in the bushing $h$.

Means are provided for effecting rotary movement of the holder T and the article K in accordance with the lead of the flutes in the broach J in order to broach accurately formed flutes within the article K and of a lead corresponding to the lead of the flutes P in the broach. To this end a guide bushing $k$ is disposed within a cavity $o$ in the front end of the holder T and, in the operative position, is adapted to seat against the adjacent end of the article K to assist in holding said article immovable in the holder T.

The broach J is guided by the guide bushing $k$ and to this end the guide bushing is provided with flutes $p$ to define ribs $q$ which extend into the flutes $p$ of the broach J. The flutes $p$ are of sufficient depth to prevent contact between the bottom surfaces of the flutes $p$ and the peripheral surfaces of the teeth L and the pilots O of the broach J, irrespective of the number of series of teeth L on the broach or on a series of broaching tools forming a set.

On the inner end of the ribs $q$ are bearing surfaces $r$ which seat against the bottom surfaces of the flutes P in the broach J to accurately centralize the broach with respect to the article K. On the outer end of the guide bushing $k$ is a head $s$ which is preferably grooved to form radial projections $t$ thus providing a convenient grip portion which may be grasped for disposing the guide bushing $k$ in the assembled position in the holder T.

In order to assure against accidental displacement of the guide bushing $k$ said guide bushing is provided with a spiral groove $u$ in the periphery of the extension $v$ which lies within the holder T, and in the head $d$ of the holder is disposed a pin $w$ which extends into the spiral groove $u$ to prevent unauthorized endwise movement of the guide bushing $k$.

The method of operation is as follows: With the article K disposed in the holder T and clamped in position by the set screw $j$ and with the guide bushing $k$ disposed in the holder T in such wise that the spiral groove $u$ will be engaged by the pin $w$, the broach J may be inserted through the guide bushing $k$ and the article K, it being of course assumed that the said article K is hollow.

The shank of the broach J may then be inserted in the chuck H and suitably clamped thereto. If then the power device A is set in operation the broach J will be gradually drawn through the article K and through the guide bushing $k$. The ribs $q$ of the guide bushing will, by the contact with the flutes P in the broach and by seating against the end of the article K, cause the entire holder T to be rotated in accordance with the lead of the flutes P. The teeth L of the broach will then cut flutes within the article K of identically the same lead and the same conformation as the flutes $p$ in the guide bushing $k$.

By permitting the bearing surfaces $r$ to closely engage the bottom surfaces of the flutes P in the broach J the broach will at all times be held accurately coaxial with the article K and the flutes formed in the article K will thus be formed sufficiently accurate for cooperation with a component part, such as a screw, without requiring any additional machining.

After the entire broach J has passed through the article K the guide bushing $k$ may be removed by turning said guide bushing in the direction necessary for disengaging the spiral slot $u$ from the pin $w$. The set screw $j$ may then be unscrewed to release the arrticle K which may be readily removed from the bushing $h$.

We claim:

1. Broaching apparatus for forming spiral flutes in an article comprising a support, article holding means journalled in the support, a non-rotating spirally toothed broaching tool adapted to be drawn through an article intended to be fluted, and a guide extending into the holding means and being seated against an article intended to be fluted, for holding such article in the holding means, and having flutes to interlock with the teeth on the broaching tool for rotating the guide and an article in accordance with the lead of the teeth on the broaching tool thereby effecting the formation of flutes in the article of the same lead as the teeth.

2. Broaching apparatus for forming spiral flutes in an article comprising a support, an article holder freely rotatable in the support, a spirally fluted non-rotating broaching tool adapted to be drawn through an article intended to be fluted, a guide bushing extending into the holder and pressing such article against the holder, spiral ribs on the holder for engagement with the flutes in the tool, thereby effecting rotation of the holder in accordance with the lead of the flutes in the tool, and means on the ribs engaging the tool for maintaining the tool in coaxial alignment with the guide bushing.

3. Broaching apparatus for forming spiral flutes in an article comprising a support, an article holder freely rotatable in the support, a spirally fluted non-rotating broaching tool adapted to be drawn through an article intended to be fluted, a guide bushing extending into the holder and pressing such article against the holder, and spiral ribs in the guide bushing engaging the flutes in the tool, thereby effecting rotation of the holder in accordance with the lead of the flutes in the tool, and bearing surfaces on the ends of the ribs to engage the bottom surfaces of the flutes in the tool for maintaining the tool in coaxial alignment with the guide bushing.

HARRISON T. JONES.
ROBERT McELROY.